United States Patent
Tanaka

(10) Patent No.: US 8,700,740 B2
(45) Date of Patent: Apr. 15, 2014

(54) CE DEVICE AND CONTENT BROWSING SYSTEM, AND CONTENT BROWSING METHOD THEREOF

(75) Inventor: Toshiyuki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/740,182

(22) PCT Filed: Dec. 25, 2008

(86) PCT No.: PCT/JP2008/003939
§ 371 (c)(1),
(2), (4) Date: Apr. 28, 2010

(87) PCT Pub. No.: WO2009/081582
PCT Pub. Date: Jul. 2, 2009

(65) Prior Publication Data
US 2010/0262676 A1  Oct. 14, 2010

(30) Foreign Application Priority Data

Dec. 26, 2007  (JP) .................................. 2007-333772
Dec. 28, 2007  (JP) .................................. 2007-339174

(51) Int. Cl.
*G06F 15/16*  (2006.01)

(52) U.S. Cl.
USPC .......... 709/219; 709/217; 709/218; 709/231; 709/246

(58) Field of Classification Search
USPC .......................... 709/219, 217, 218, 231, 246
See application file for complete search history.

(56) References Cited

U.S. PATENT DOCUMENTS

| | | | | |
|---|---|---|---|---|
| 6,023,714 A | * | 2/2000 | Hill et al. ....................... | 715/235 |
| 7,287,252 B2 | * | 10/2007 | Bussiere et al. ............... | 717/176 |
| 2004/0267900 A1 | * | 12/2004 | Hoekstra et al. ............... | 709/217 |
| 2005/0132287 A1 | * | 6/2005 | Matsuzawa et al. .......... | 715/527 |

FOREIGN PATENT DOCUMENTS

| | | |
|---|---|---|
| JP | 04-214595 | 8/1992 |
| JP | 11-039132 | 2/1999 |
| JP | 2002-215503 A | 8/2002 |
| JP | 2002-278980 A | 9/2002 |
| JP | 2002-342221 A | 11/2002 |
| JP | 2006-067363 A | 3/2006 |
| JP | 2006-195843 A | 7/2006 |

OTHER PUBLICATIONS

International Search Report for International Application No. PCT/JP2008/003939, Feb. 10, 2009, Panasonic Corporation.

* cited by examiner

*Primary Examiner* — Jude Jean Gilles
*Assistant Examiner* — Jaren M Means
(74) *Attorney, Agent, or Firm* — McDermott Will & Emery LLP

(57) ABSTRACT

A content browsing method includes: a step where a CE device transmits an HTTP request including ability data concerning the CE device to a GUI distribution server; a step where the GUI distribution server determines the CE device based upon the content browsing ability data concerning the CE device; a step where the GUI distribution server makes an HTTP request for a search URL to the content data server based upon a determination result; a step where the GUI distribution server synthesizes the search URL to a GUI template; a step where the GUI distribution server transmits the synthesized GUI template to the CE device; and a step where the CE device transmits an HTTP request for a media data URL to the content data server, and the method performs server processing in accordance with the ability of the CE device.

11 Claims, 16 Drawing Sheets

FIG. 2

```
GET /myinfo HTTP/1.0
User-Agent: CE-Browser; Version=1.00
Keep-Alive: 300
X-Login: VDW84b¥BJF793HGJD
X-Terminal-Ability-Color: Yes
X-Terminal-Ability-HTML: No
X-Terminal-Ability-CSS: No
X-Terminal-Ability-font: Yes
X-Terminal-Ability-XML: No
X-Terminal-Ability-JavaScript: 1.6
X-Terminal-Ability-Image-format: jpg, png
X-Terminal-Ability-Image-size: 40KB
X-Terminal-Ability-Video: MPEG1, MPEG2, H. 264
X-Terminal-Ability-Audio: MP3, AAC
```

FIG. 3

| Color display ability | HTML ability | CSS ability | Font drawing ability | XML analysis ability | JavaScript execution ability | Image display ability | Video reproduction ability | Audio reproduction ability |
|---|---|---|---|---|---|---|---|---|
| ◎ | ○ | ○ | ◎ | ○ | 1.5 | jpg | × | × |

FIG. 7

```
<head>
<script type="text/javascript">
  function setNews(XML) {
    var string_item1, string_item2, string_item3;

// Analysis procedure for XML [omitted]

document.getElementById("item1"). innerHtml = string_item1;
    document.getElementById("item2"). innerHtml = string_item2;
    document.getElementById("item3"). innerHtml = string_item3;
  }
</script>

</head>
<body style="margin:0; ">
<div id="news" style="background-color:FF0000; width:300; height:120; padding:10">
<div id=" item1" style="background-color:00ffff; width:250; height:30"></div>
<div id="item2" style="background-color: ff00ff; width:250; height:30"></div>
<div id="item3" style="background-color: ffff00; width:250; height:30"></div>
</div>
<script language"JavaScript" src="http://NEWS-SITE/latest?callback=setNews"></script>

</body>
</html>
```

FIG. 8

```
var obj = document . getContext("2d");

obj . fillStyle() = "#ffffff";
obj . fillRect(0,0,300,120);

obj . fillStyle() = "#00ffff";
obj . fillRect(10,10,250,30);
obj . drawText(15,35, "NEWS1...");

obj . fillStyle() = "#ff00ff";
obj . fillRect(10,40,250,30);
obj . drawText(15,65, "NEWS2...");

obj . fillStyle() = "#ffff00";
obj . fillRect(10,70,250,30);
obj . drawText(15,95, "NEWS3...");
```

FIG. 9

```
HTTP/1.0 204 No Content
Content-Type: text/plain; charset=UTF-8

Sorry, you can't show this page.
```

FIG. 12A
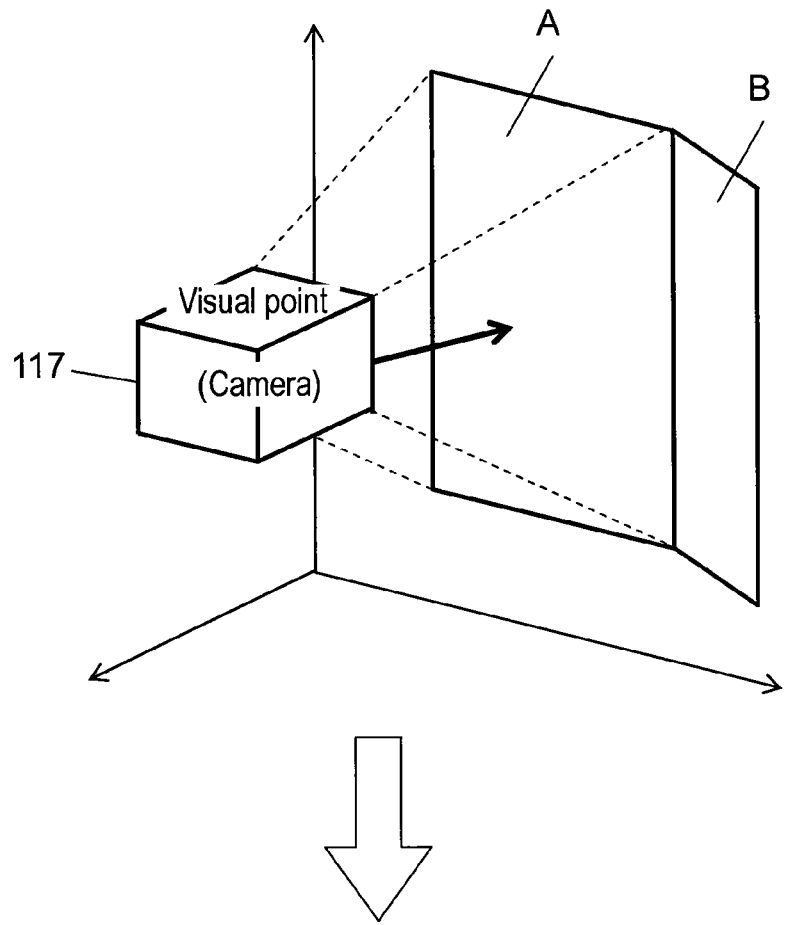
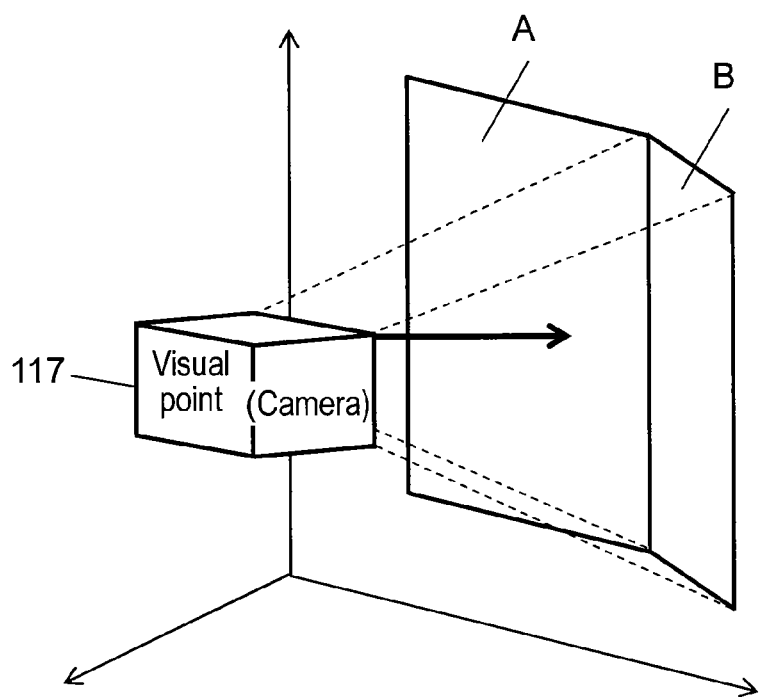

CE DEVICE AND CONTENT BROWSING SYSTEM, AND CONTENT BROWSING METHOD THEREOF

This application is a U.S. National Phase Application of PCT International Application PCT/JP2008/003939.

TECHNICAL FIELD

The present invention relates to a CE device and a content browsing system, and a content browsing method thereof, for efficiently browsing contents disclosed on the Internet with a computer or a television receiver.

BACKGROUND ART

A conventional content browsing method for contents disclosed on the Internet is to access a content data server with a personal computer through use of a Web server (e.g. see Patent Document 1). FIG. 15 is a schematic diagram of a conventional system for performing content browsing. In the content browsing system, personal computer devices (hereinafter abbreviated as "PC devices") 314, 315, 316 used by a plurality of viewers for content browsing, and the like are connected to Web server 350, content data servers 341, 342, and the like through network 320.

FIG. 16 shows a flowchart at the time of conventional content browsing. For example, when PC device 314 browses contents of content data server 341, PC device 314 first makes an HTTP request to Web server 350 through network 320. Web server 350 then transmits Web contents, such as a link to a search URL with respect to each of content data servers 341, 342 and an HTML with an analysis procedure for a search result embedded therein, to PC device 314. Subsequently, PC device 314 directly makes an HTTP request for the search URL to content data server 341. Content data server 341 then searches a URL, and transmits a search result to PC device 14 in an XML file or the like. PC device 314 makes an HTTP request for a media data URL to content data server 341. Content data server 341 then transmits media data to PC device 314. Finally, PC device 314 performs screen drawing so as to display the received media data on a screen of the PC device.

Further, also in a case of browsing contents of content data server 342, PC device 314 makes an HTTP request to Web server 350 through network 320, and thereafter, PC device 314 directly makes an HTTP request for a search URL to content data server 342, to execute a similar flow.

However, in the above-mentioned conventional configuration, browsing efficiency is restricted by a processing ability (CPU, memory, and the like) of a personal computer. For this reason, comfortable content browsing necessitates mounting of a high processing-speed CPU and a large capacity memory in the PC device, which has caused a problem of necessitating a high-priced terminal.

Further, an interface between an operator and a computer is of importance for efficiently browsing contents as described above, which requires a menu screen displaying method excellent in convenience and a menu screen display device that realizes the displaying method.

Among the conventional menu screen display devices, there are a device that animates transition of an operation menu, and a device capable of changing menu design (background image, and the like) with respect to each user.

Further, there is a menu screen display device that performs a three-dimensional display for displaying a large number of menu screens (e.g. see Patent Document 2).

However, in the conventional menu screen display device, at the time of getting into and out of a menu, each of those operations thereof needs to be described. Further, there has been a problem in that in a case of wishing to define different transition animation with respect to each menu layer, operations in the number of transition need to be described.

[Patent Document 1] Unexamined Japanese Patent Publication No. 2006-195843
[Patent Document 2] Unexamined Japanese Patent Publication No. H04-214595

DISCLOSURE OF THE INVENTION

A content browsing system of the present invention is a content browsing system for browsing media data of contents of a content data server which are disclosed on a network. That is, the content browsing system is provided with a consumer electronic device (hereinafter abbreviated as "CE device"), a GUI distribution server, and a content data server. The CE device performs screen drawing of the media data to browse the data. The GUI distribution server receives an HTTP request including content browsing ability data concerning the CE device, and determines a content browsing ability of the CE device based upon the received content browsing ability data concerning the CE device. The content data server transmits a search URL to the GUI distribution server.

When the GUI distribution server determines that the content browsing ability of the CE device requires proxy for server processing by the GUI distribution server in browsing of contents of the content data server, the GUI distribution server makes an HTTP request for the search URL to the content data server. Further, the content data server transmits a URL as a search result including the media data to the GUI distribution server based upon the HTTP request. The GUI distribution server synthesizes the URL as the search result to a GUI template, and transmits the template as a synthesized GUI template to the CE device. The CE device transmits the HTTP request for a media data URL to the content data server based upon the synthesized GUI template. The content data server then transmits the media data to the CE device.

With such a method, it is possible to efficiently browse contents on the Internet even with a popular-priced terminal.

Further, a CE device of the present invention is a CE device for performing screen drawing of media data of contents of a content data server which are disclosed on a network, to browse the data, wherein the network includes: a GUI distribution server that receives an HTTP request including content browsing ability data concerning the CE device and determines a content browsing ability of the CE device based upon the received content browsing ability data concerning the CE device; and a content data server that transmits a search URL to the GUI distribution server.

When the GUI distribution server determines that the content browsing ability of the CE device requires proxy for server processing by the GUI distribution server in browsing of contents of the content data server, the GUI distribution server makes an HTTP request for the search URL to the content data server. The content data server then transmits a URL as a search result including the media data to the GUI distribution server based upon the HTTP request. Further, the GUI distribution server synthesizes the URL as the search result to a GUI template and transmits the template as a synthesized GUI template to the CE device. Moreover, the CE device transmits the HTTP request for a media data URL to the content data server based upon the synthesized GUI template. Furthermore, the content data server transmits the media data to the CE device. The CE device may then perform screen drawing of the media data to browse the data.

With such a configuration, transition animation of the menu can be easily switched by switching data that describes the position of each layer.

Further, a content browsing method of the present invention is a content browsing method for browsing media data of contents of a content data server which are disclosed on a network, and has steps as follows. That is, the method may have: a step where a CE device transmits an HTTP request including content browsing ability data concerning the CE device to a GUI distribution server; a step where the GUI distribution server determines a content browsing ability of the CE device based upon the content browsing ability data concerning the CE device; a step where the GUI distribution server determines whether or not the content browsing ability of the CE device requires proxy for server processing by the GUI distribution server, or whether the content browsing ability does not allow browsing the contents, in browsing of contents of the content data server; a step where the GUI distribution server mutually communicates with the content data server of the network or the CE device, based upon a determination result of the determining step, to obtain data; and a step where the CE device performs screen drawing of the data based upon the data obtained by the data obtaining step.

BRIEF DESCRIPTION OF THE DRAWINGS

FIG. 2 is a diagram showing a specific example of an HTTP request made by a CE device in Embodiment 1 of the present invention to a GUI distribution server.

FIG. 3 is a diagram showing a reference as to whether a GUI template requested from the CE device in Embodiment 1 of the present invention can be browsed.

FIG. 7 is a view showing a specific example of a GUI template in the case where contents of the content data server can be browsed only by the CE device in Embodiment 1 of the present invention.

FIG. 8 is a view showing a specific example of a GUI template in the case where contents of the content data server can be browsed by the CE device in Embodiment 1 of the present invention and the GUI distribution server.

FIG. 9 is a view showing a specific example of a response returned by the GUI distribution server in the case where contents of the content data server cannot be browsed by the CE device in Embodiment 1 of the present invention.

FIG. 12A is a conceptual view of a menu screen display performed by the menu screen display device in Embodiment 2 of the present invention.

REFERENCE MARKS IN THE DRAWINGS

Figure 1:
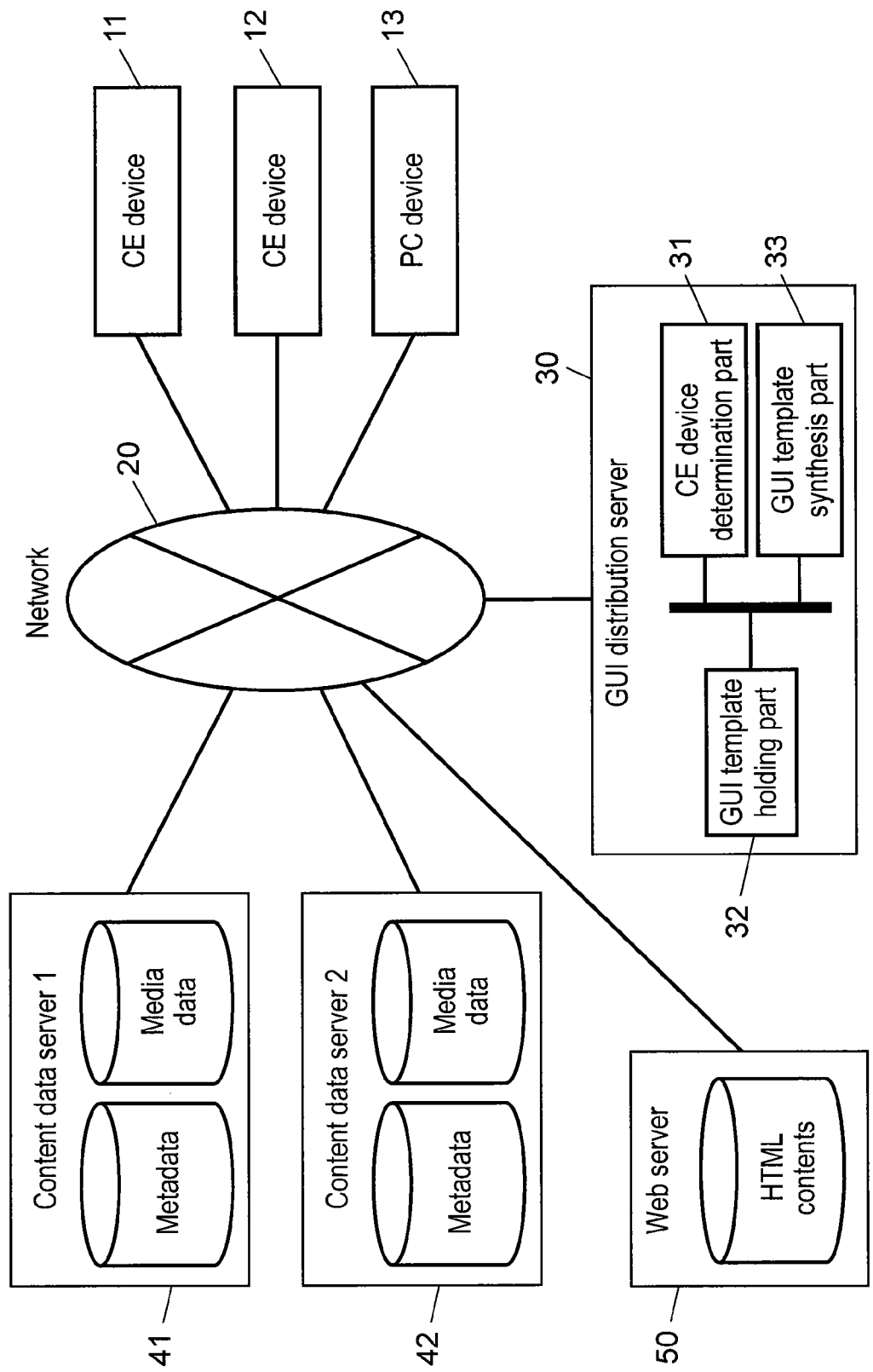
FIG. 1 is a schematic diagram of a system for performing content browsing in Embodiment 1 of the present invention.

11, 12 CE device
13 PC device
20 network
30 GUI distribution server
31 CE device determination part
32 GUI template holding part
33 GUI template synthesis part
41, 42 content data server
50 Web server
100 menu screen display device
101 menu information storing part
102 menu layer position storing part
103 menu information describing part
104 visual point shifting part
105 display part
110 setup menu (first menu layer)
112 language menu (second menu layer)
114 America menu (third menu layer)
116 Asia-Pacific menu (third menu layer)
117 camera (visual point)
118 in-transition screen
120 arrow
122 arrow Preferred Embodiments for Carrying Out of the Invention Hereinafter, preferred embodiments for executing the present invention is described with reference to drawings.

(Embodiment 1)

FIG. 1 is a schematic diagram of a system for performing content browsing in Embodiment 1 of the present invention. In the content browsing system, CE (Consumer Electronics) devices 11, 12 used by a plurality of viewers for content browsing, PC device 13, and the like are connected to GUI distribution server 30, content data servers 41, 42 and the like, and Web server 50 through network 20.

CE device 11 is provided with a connecting part (not shown) connectable to network 20, and an image display part (not shown) for displaying contents on network 20. When browsing contents of content data servers 41, 42 and the like which are on network 20, CE device 11 first transmits an HTTP request including ability data concerning CE device 11 to GUI distribution server 30. CE device 11 then acquires a synthesized GUI template from GUI distribution server 30. CE device 11 receives media data from content data servers 41, 42, to perform image drawing. CE device 11 is made up of a PC device or a television receiver, and accesses GUI distribution server 30 and thereafter browses contents on network 20.

Network 20 is the same as a network of the Internet conventionally in use with PC devices.

GUI distribution server 30 is configured of CE device determination part 31, GUI template holding part 32, and GUI template synthesis part 33. For example when a request for a GUI template is made by CE device 11 to GUI distribution server 30, GUI distribution server 30 analyzes content browsing ability data concerning CE device 11 which is included in an HTTP request received from CE device 11. GUI distribution server 30 then determines whether CE device 11 can single-handedly browse the requested GUI template contents, or can perform browsing with proxy for server processing by GUI distribution server 30, or cannot perform browsing.

When determining that CE device 11 can single-handedly perform browsing, GUI distribution server 30 transmits a non-synthesized GUI template to CE device 11. Hence GUI distribution server 30 needs neither to access content data server 41 and the like nor synthesize the GUI template. Further, when determining that CE device 11 needs proxy for server processing, GUI distribution server 30 makes an HTTP request to content data server 41. Based upon a search result transmitted from content data server 41, GUI distribution server 30 synthesizes a GUI template. Subsequently, GUI distribution server 30 transmits the synthesized GUI template to CE device 11.

Moreover, when determining that CE device 11 cannot perform browsing, GUI distribution server 30 transmits to CE device 11 notification indicating that contents of content data server 41 cannot be browsed.

Content data servers 41, 42 are almost the same as a content data server on the Internet conventionally in use with PC devices. What is different is that additionally writing a specific URL or a parameter specific to an HTTP request can return a search result in a structured document such as XML. These specific URL and parameter have been opened to the public, and the same service is also provided to all devices connected to network 20.

Next described is a reference with which GUI distribution server 30 determines an ability of CE device 11. FIG. 2 is a diagram showing a specific example of an HTTP request made by the CE device in Embodiment 1 of the present invention to the GUI distribution server. That is, it is an example of performance data concerning the CE device, which is transmitted by CE device 11 to the GUI distribution server concurrently with the HTTP request.

There are kinds of performance data concerning CE device 11 as follows: a color display ability (X-terminal-Ability-Color); an HTML ability (X-terminal-Ability-HTML); a CSS (Cascading Style Sheets) ability (X-terminal-Ability-CSS); a font drawing ability (X-terminal-Ability-font); an XML analysis ability (X-terminal-Ability-XML); a JavaScript (registered trademark of Sun Microsystems, Inc.) execution ability (X-terminal-Ability-JavaScript); an image display ability (X-terminal-Ability-Image-format, X-terminal-Ability-Image-size); a video reproduction ability (X-terminal-Ability-Video); and an audio reproduction ability (X-terminal-Ability-Audio).

For example, the HTML ability means an ability to analyze an HTML document and then lay out and draw each element, and the CSS ability means an ability to make style information, described in CSS, correspond to the HTML element. The JavaScript execution ability means an ability to execute JavaScript, and if JavaScript can be executed, an executable version of JavaScript is described. Further, the image display ability is divided into two items, and a corresponding image format and an image size which can be processed are described. These kinds of performance data are mere examples, and not restricted thereto.

Moreover, as for the GUI template requested by CE device 11, the template needs to search each of content data servers 41, 42 and analyze an XML as a search result. FIG. 3 is a diagram showing a reference as to whether a GUI template requested from the CE device in Embodiment 1 of the present invention can be browsed. It is to be noted that the reference shown in FIG. 3 corresponds to each GUI template, and an "x" mark indicates an ability not required in a target GUI template. A "double circle" mark indicates an essential ability. Further, a "circle" mark indicates an ability which is requested for CE device 11, but can be executed as proxy by GUI distribution server 30. Moreover, a minimum requested version may be described as the JavaScript execution ability, and a corresponding format may be described as the image display ability. The references shown in FIG. 3 may be dynamically produced by automatically extracting abilities required by CE device 11, or may be previously created by a person who creates a GUI template.

When CE device 11 satisfies all the performance data, GUI distribution server 30 determines that contents of content data server 41 can be browsed only by CE device 11. GUI distribution server 30 then does not make an HTTP request for a search URL to content data servers 41, 42.

Further, when CE device 11 does not satisfy any of the HTML ability, the CSS ability, the font drawing ability, the XML ability and the JavaScript execution ability; for example when CE device 11 does not satisfy the HTML ability, the CSS ability and the XML ability as shown in FIG. 2, GUI distribution server 30 determines that contents of content data server 41 cannot be browsed only by CE device 11. GUI distribution server 30 then makes an HTTP request for a search URL to content data servers 41, 42. Based upon a search result, GUI distribution server 30 synthesizes a GUI template. Further, only an ability insufficient for CE device 11 that has been requested may be executed as proxy by GUI distribution server 30.

Moreover, when CE device 11 does not satisfy either the color display ability or the font drawing ability, namely when "X-Terminal-Ability-Color" is indicated as "No" as shown in FIG. 2 due to CE device 11 not having font information, CE device 11 does not satisfy the font drawing ability. Therefore, GUI distribution server 30 determines that CE device 11 cannot browse contents of content data server 41. GUI distribution server 30 then transmits to GUI distribution server 30 notification indicating that contents of content data server 41 cannot be browsed.

Figure 4:
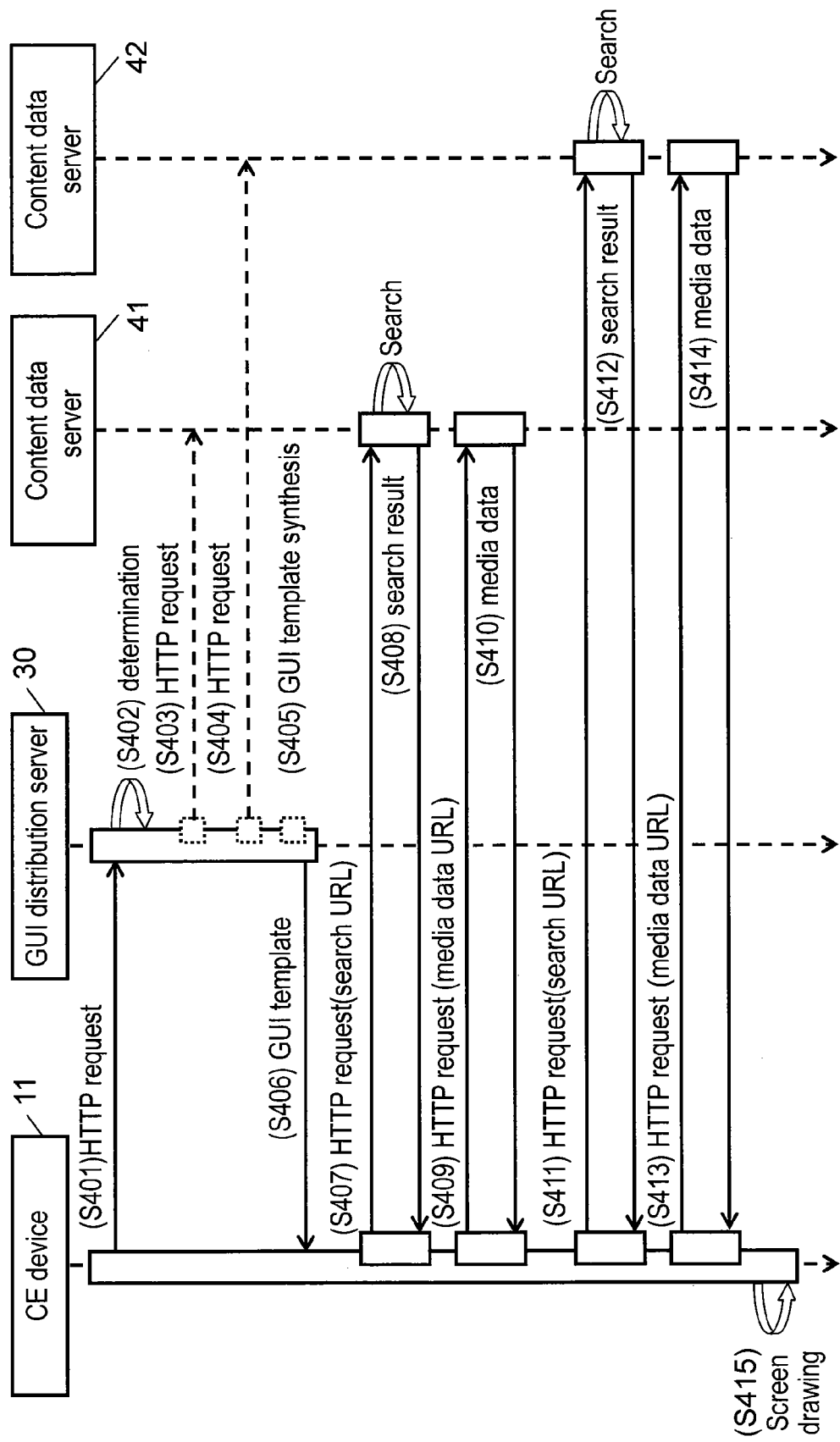
FIG. 4 is a flowchart at the time of content browsing in a case where contents of a content data server can be browsed only by the CE device in Embodiment 1 of the present invention.
Figure 5:
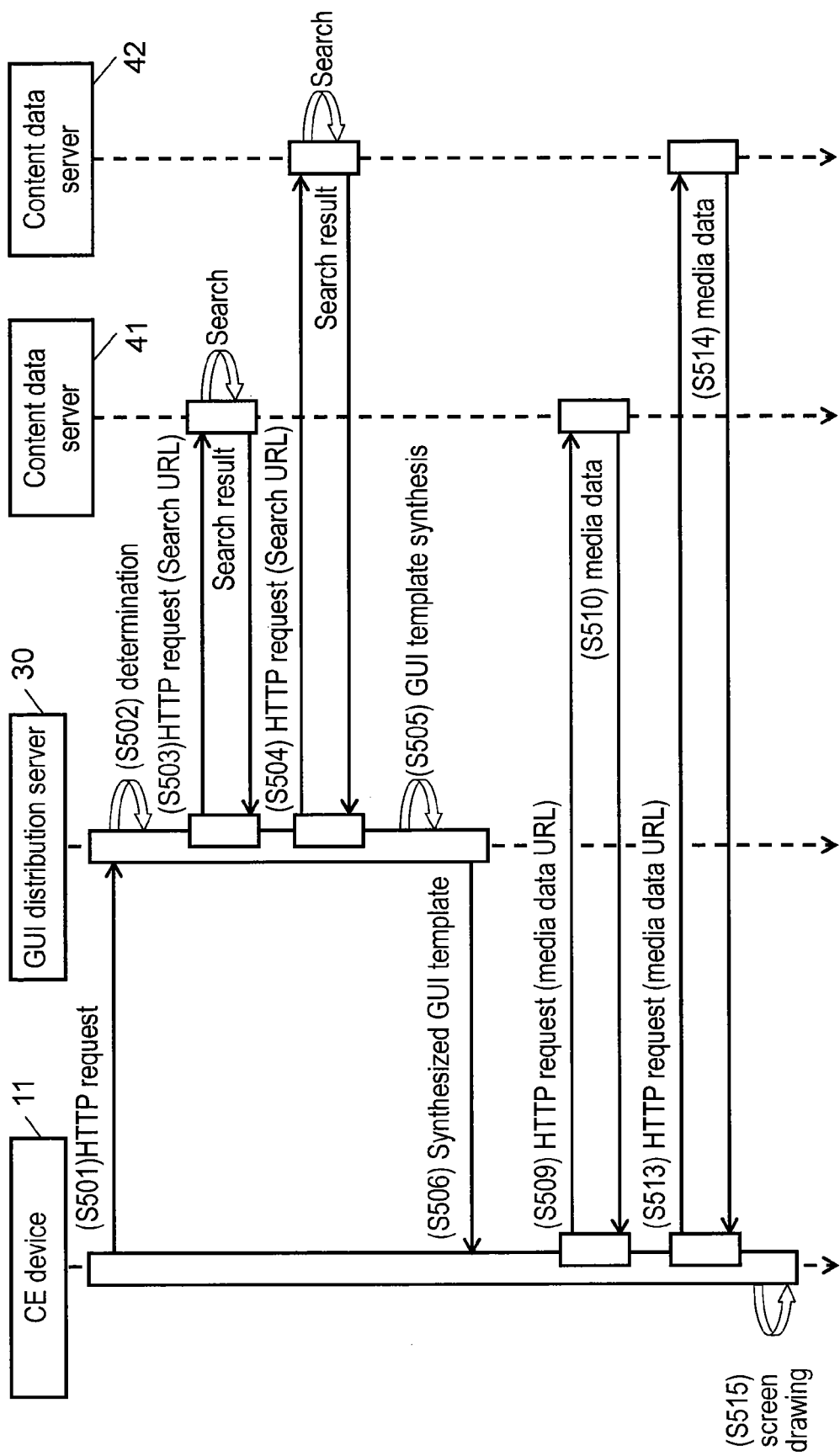
FIG. 5 is a flowchart at the time of content browsing in a case where contents of the content data server can be browsed by the CE device in Embodiment 1 of the present invention and the GUI distribution server.
Figure 6:
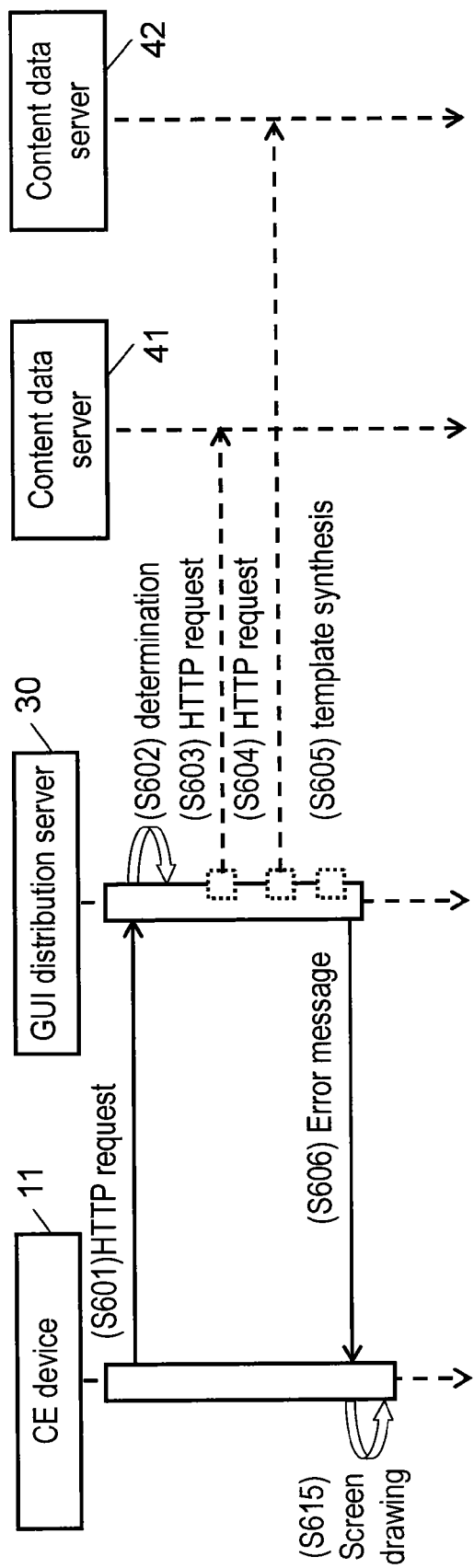
FIG. 6 is a flowchart at the time of content browsing in a case where contents of the content data server cannot be browsed by the CE device in Embodiment 1 of the present invention.

Next, a flowchart at the time of content browsing is described. FIG. 4 is a flowchart at the time of content browsing in a case where contents of the content data server can be browsed only by the CE device in Embodiment 1 of the present invention. Further, FIG. 5 is a flowchart at the time of content browsing in a case where contents of the content data server can be browsed by the CE device in Embodiment 1 of the present invention and the GUI distribution server. Moreover, FIG. 6 is a flowchart at the time of content browsing in a case where contents of the content data server cannot be browsed by the CE device in Embodiment 1 of the present invention.

Here, a flowchart at the time of content browsing in a case where contents of content data server 41 can be browsed only by CE device 11 is described with reference to FIG. 4. In this case, as indicated with solid lines in FIG. 4, first, CE device 11 transmits an HTTP request including content browsing ability data concerning CE device 11 to GUI distribution server 30 (step S401). GUI distribution server 30 then analyzes the HTTP request received from CE device 11 to acquire an ability of the CE device, and determines that proxy processing on content data server 41 is unnecessary (step S402). In this case, as indicated with broken lines in FIG. 4, GUI distribution server 30 does not make an HTTP request for a search URL to content data server 41 (step S403). Moreover, as in step S403, GUI distribution server 30 does not make an HTTP request for search URL of content data server 42 (step S404).

GUI distribution server 30 does not synthesize a GUI template (step S405), and transmits a non-synthesized GUI template to CE device 11 (step S406).

Subsequently, based upon the GUI template received from GUI distribution server 30, CE device 11 makes an HTTP request for a search URL to content data server 41 (step S407). Based upon contents of the HTTP request, content data server 41 searches media data from metadata. Based upon the search result, content data server 41 transmits a search result including a URL of media data to CE device 11 (step S408).

Accordingly, CE device 11 acquires a required URL of media data from the search result in accordance with a procedure described in the GUI template. Further, CE device 11 makes an HTTP request for a media data URL to content data server 41 (step S409). Content data server 41 then transmits media data concerning the requested URL to CE device 11 (step S410).

As in steps S407 to S410, when CE device 11 also transmits to content data server 42 an HTTP request for a search URL (steps S411 to S412) and an HTTP request for a media data URL (steps S413 to S414) based upon the GUI template received from GUI distribution server 30, steps S407 and S411 of the HTTP requests are processed in parallel. Finally, CE device 11 performs screen drawing for displaying the received media data on a screen of CE device 11 (step S415).

Next, a flowchart at the time of content browsing in a case where contents of content data server 41 can be browsed by CE device 11 and GUI distribution server 30 is described with reference to FIG. 5. In this case, as indicated with solid lines in FIG. 5, first, CE device 11 transmits an HTTP request including content browsing ability data on CE device 11 to GUI distribution server 30 as shown FIG. 2 (step S501). GUI distribution server 30 then analyzes the HTTP request received from CE device 11 to acquire a content browsing ability of the CE device, and determines that proxy processing on content data server 41 is necessary (step S502). Although the ability data to be transmitted by CE device 11 is added to an HTTP header and then transmitted in the example shown in FIG. 2, it may be given in form of a URL parameter.

Subsequently, based upon the foregoing determination result, when determining that the ability of CE device 11 requires proxy for server processing by GUI distribution server 30 in browsing of contents of content data server 41, GUI distribution server 30 makes an HTTP request for a search URL to content data server 41. Based upon contents of an HTTP request for the search URL, content data server 41 searches media data from metadata. Based upon the search result, content data server 41 transmits a search result including a URL of media data to GUI distribution server 30. Accordingly, GUI distribution server 30 acquires a search result of content data server 41, which is described in the GUI template, from content data server 41 (step S503).

The number of HTTP requests to the plurality of content data servers 41, 42 may be one or plural. This depends upon an original GUI template. As in step S503, in the case of making an HTTP request for a search URL of content data server 42, the HTTP request is processed in parallel (step S504). It is to be noted that there are cases where part of an argument of this URL is embedded in step S501. In addition, a response result from content data server 41 may not be a text but may be media data such as an image or a moving picture.

GUI distribution server 30 analyzes the search result of step S503, and performs a step of synthesizing a URL as the foregoing search result to a GUI template. For example, synthesis between a list of items of the latest news as the search result and a URL of a related image, or the like, is performed (step S505). Further, in the case of the search result of step S503 being media data, format conversion, size conversion and the like may be performed to bring GUI distribution server 30 into a state accessible with a temporary URL. GUI distribution server 30 then transmits the synthesized GUI template, synthesized in step S505, to CE device 11 (step S506).

Based upon the synthesized GUI template received from GUI distribution server 30, CE device 11 makes an HTTP request for a media data URL to content data server 41 (step S509). Content data server 41 then transmits the requested URL media data to CE device 11 (step S510). As in steps S509 to S510, in the case of making an HTTP request for a media data URL of content data server 42 (step S513 to S514), steps S509 and S513 of the HTTP requests are processed in parallel. Finally, CE device 11 performs screen drawing for displaying the received media data on the screen of CE device 11 (step S515).

Next, a flowchart at the time of content browsing in a case where contents of content data server 41 cannot be browsed by CE device 11 is described with reference to FIG. 6. In this case, as indicated with solid lines in FIG. 6, first, CE device 11 transmits an HTTP request including content browsing ability data on CE device 11 (step S601). GUI distribution server 30 then analyzes the HTTP request received from CE device 11 to acquire a content browsing ability of the CE device, and determines that contents of the content data server cannot be browsed (step S602).

In this case, as indicated with broken lines in FIG. 6, GUI distribution server 30 does not make an HTTP request for a search URL to content data server 41 (step S603). Moreover, as in step S603, GUI distribution server 30 does not make an HTTP request for search URL of content data server 42 (step S604).

GUI distribution server 30 does not synthesize a GUI template (step S605), and transmits to CE device 11 notification that contents of content data server 41 cannot be browsed by CE device 11 (step S606). Finally, CE device 11 performs screen drawing on the screen for displaying the notification indicating that contents of content data server 41 cannot be browsed (step S615).

As described above, the content browsing method in the present embodiment is a content browsing method for browsing media data of contents in the content data server which are disclosed on the network, and has the following steps.

Specifically, the content browsing method has: a step where a CE device transmits an HTTP request including content browsing ability data concerning the CE device to a GUI distribution server; a step where the GUI distribution server determines a content browsing ability of the CE device based upon the content browsing ability data concerning the CE device; a step where the GUI distribution server determines whether or not the content browsing ability of the CE device requires proxy for server processing by the GUI distribution server, or whether the content browsing ability does not allow browsing of the contents, in browsing of contents of the content data server; a step where the GUI distribution server mutually communicates with the content data server of a network or the CE device, based upon a determination result of the determining step, to obtain data; and a step where the CE device performs screen drawing of the data based upon the data obtained by the data obtaining step. With such a method used, it is possible to efficiently browse contents on the Internet even with a popular-priced terminal.

Finally, a GUI template at the time of content browsing is described. FIG. 7 is a view showing a specific example of a GUI template in the case where contents of the content data server can be browsed only by the CE device in Embodiment 1 of the present invention. Further, FIG. 8 is a view showing a specific example of a GUI template in the case where contents of the content data server can be browsed by the CE device in Embodiment 1 of the present invention and the GUI distribution server. Moreover, FIG. 9 is a view showing a specific example of an OSD display in the case where contents of the content data server cannot be browsed by the CE device in Embodiment 1 of the present invention.

First, a GUI template at the time of content browsing in the case where contents of content data server 41 can be browsed only by CE device 11 is described with reference to FIG. 7. This GUI template is designed in HTML and CSS, and is required to have an ability to analyze JavaScript and XML.

Subsequently, a GUI template in the case where contents of content data server 41 can be browsed by CE device 11 and GUI distribution server 30 is described with reference to FIG. 8. In FIG. 8, FIG. 7 has been converted into coordinate information so that even CE device 11 not having the HTML ability and the CSS ability can perform drawing. Further, portions of "News1 . . . " and "News2 . . . " are information collected by GUI distribution server 30 from content data servers 41, 42. As thus described, a result of execution by GUI distribution server 30 as proxy for the HTML ability, the CSS ability and data collection (search) in CE device 11 has been synthesized to the GUI template.

Moreover, with reference to FIG. 9, an example of an OSD display is described based upon a response returned by the GUI distribution server in the case where contents of content data server 41 cannot be browsed by CE device 11. When it is determined that a terminal of CE device 11 is not provided with a minimum ability for content browsing, an HTTP error code "204" is returned along with a message "Sorry, you can't show this page".

CE device 11 with the font drawing ability performs an OSD display of the message, and CE device 11 without the font drawing ability performs an OSD display decided in advance, determining from the HTTP error code.

With such a configuration, the GUI distribution server determines the ability of the CE device based upon ability data concerning the CE device, whereby it is possible to decide flows of the CE device, the GUI distribution server and the content data server, and to perform browsing of contents on the Internet which suits the ability of the CE device, so as to efficiently browse contents on the Internet even with a popular-priced terminal such as a television receiver.

(Embodiment 2)

In Embodiment 2 of the present invention, there are described: a menu screen displaying method excellent in convenience with an operator-computer interface or the like devised in order to efficiently browse contents inside the device and media data of contents acquired from the network as in Embodiment 1 of the present invention; and a menu screen display device that realizes the displaying method.

A CE device obtained by further adding a menu display function of Embodiment 2 of the present invention to the CE device in Embodiment 1 of the present invention is also referred to as a menu screen display device.

Figure 10:
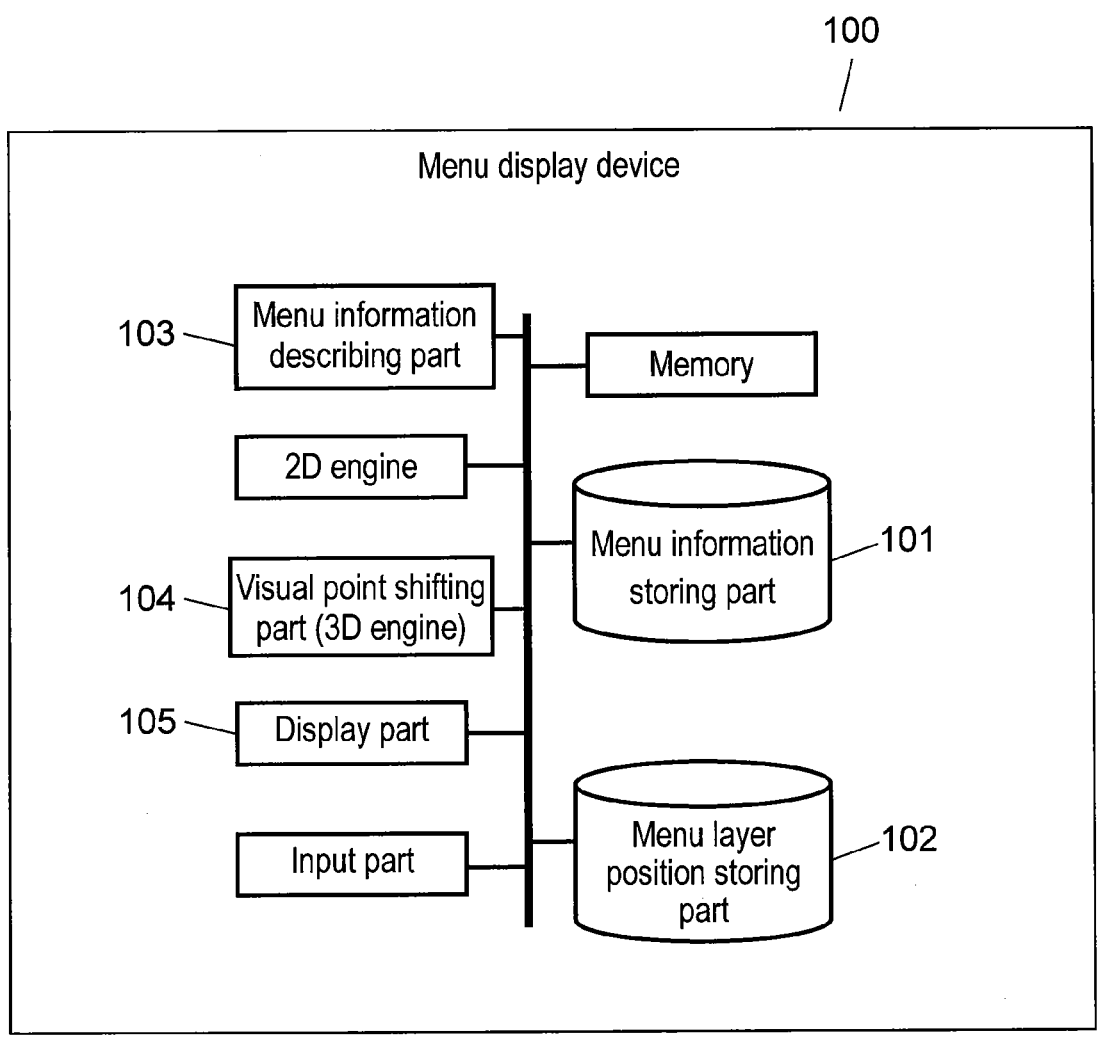
FIG. 10 is a block diagram of a menu screen display device in Embodiment 2.

First, a configuration of the menu screen display device in accordance with a content browsing method in Embodiment 2 of the present invention is described. FIG. 10 is a block diagram of a menu screen display device in Embodiment 2 of the present invention.

Menu screen display device 100 includes menu information storing part 101, menu layer position storing part 102, menu information describing part 103, visual point shifting part 104, and display part 105. As shown in FIG. 10, those are individually connected to a bus, being configured so as to exchange signals. Further, the bus may be connected with a memory required by each of those parts. Moreover, the bus is connected with an input part. The input part may, for example, be a remote controller, a key board or a mouse, and it may be a man-machine interface. In other words, the input part may have a function of reflecting an operation by a user to menu screen display device 100.

Menu information storing part 101 stores menu information of media data with respect to each menu layer. Menu information storing part 101 is configured by an HDD and a nonvolatile memory.

Menu layer position storing part 102 stores a position for arrangement of the menu layer in a virtual space. Menu layer position storing part 102 is configured by an HDD and a nonvolatile memory. Further, menu information storing part 101 and menu layer position storing part 102 may be integrally configured using the same HDD or the like.

When selecting a second menu layer in a first menu layer, menu information describing part 103 describes menu information of the second menu layer which is stored in menu information storing part 101 in a position of the second menu layer which is stored in menu layer position storing part 102. Menu information describing part 103 is configured by a CPU and the like, and reads data of menu information storing part 101 and menu layer position storing part 102 to perform control processing. Menu information describing part 103 is provided with control software therefore.

When the second menu layer is described by menu information describing part 103, visual point shifting part 104 performs image processing so as to shift a visual point on the screen from the first menu layer to the second menu layer. Whether a positional relation from the first menu layer to the second menu layer is two-dimensional or three-dimensional, visual point shifting part 104 performs image processing so as to virtually shift the camera for shirting a photographing screen. Therefore, a menu screen is drawn smoothly without having excess video data.

Visual point shifting part 104 is configured by a 3D engine. In order to optimally display a whole of the menu screen, visual point shifting part 104 controls the menu screen and a position and a distance of the visual point through use of positional information on arrangement of the menu layer in the virtual space which is stored in menu layer position storing part 102 and information such as a size of the menu screen. Visual point shifting part 104 performs such image processing to change a state of expression of the menu screen and makes an output thereof.

Display part 105 displays, as video data, a menu screen obtained by visual point shifting part 104 performing image processing as if virtually performing photographing by shifting a camera. It may be thought that display part 105 includes a display device such as a PDP or a liquid crystal. Display part 105 can be realized by driver software of a display device, or driver software of a display device and the display device, or the like.

Figure 11:
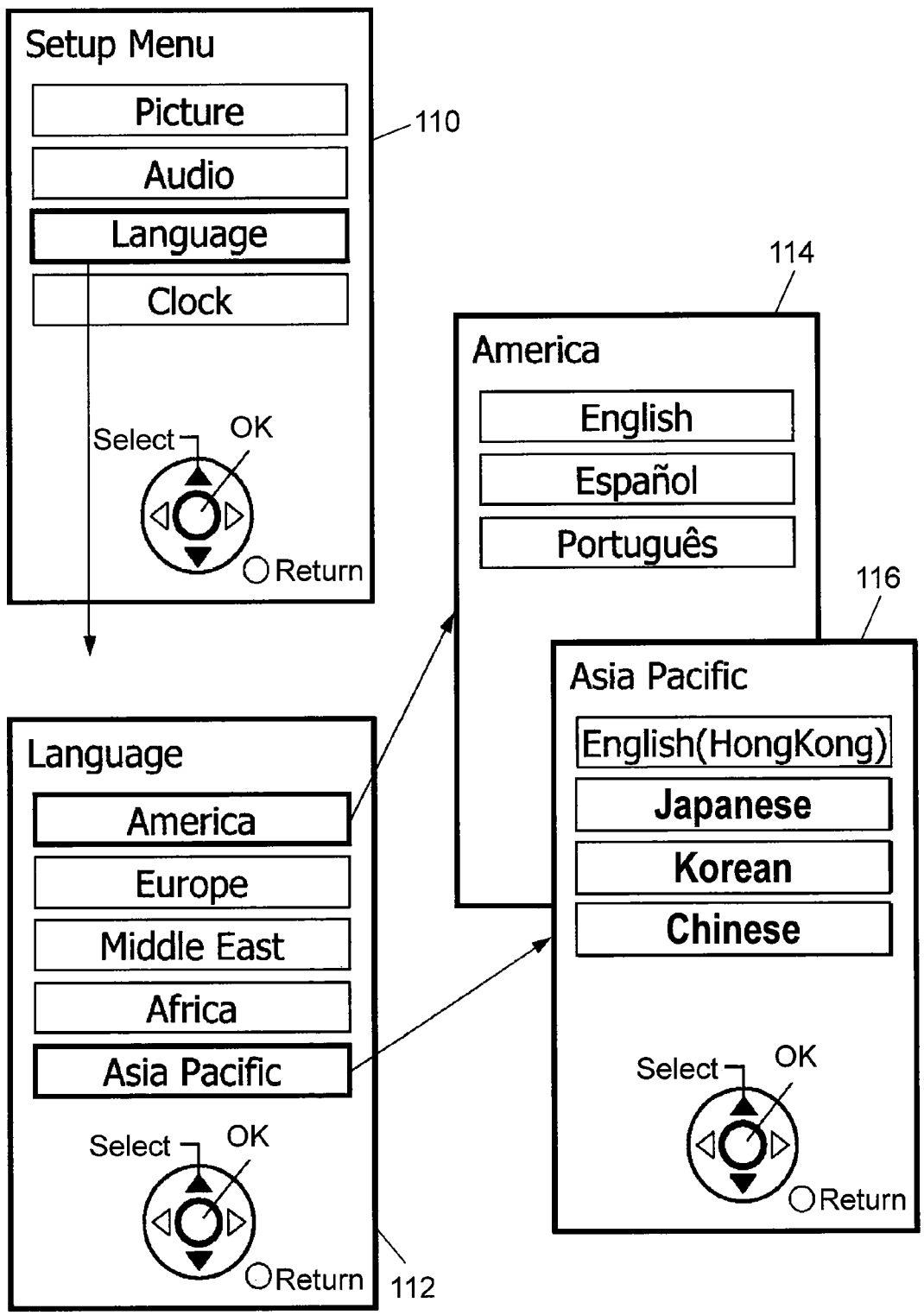
FIG. 11 is a view of a menu screen displayed by the menu screen display device in Embodiment 2 of the present invention.

Next described is a menu screen display performed by the menu screen display device in accordance with the content browsing method in Embodiment 2 of the present invention. FIG. 11 is a view of a menu screen displayed by the menu screen display device in Embodiment 2 of the present invention.

The menu screen display device displays menu information with respect to each menu layer, the information being stored in menu information storing part 101 with respect to each menu layer. First, as shown in FIG. 11, when "Language" is selected in setup menu (first menu layer) 110, language menu (second menu layer) 112 is menu-displayed. Further, when "America" is selected in language menu (second menu layer) 112, "English", "Spanish" and "Portuguese" as languages of America are menu-displayed in America menu (third menu layer) 114. Alternately, when "Asia Pacific" is selected in language menu (second menu layer) 112, "English (Hong Kong)", "Japanese", "Korean" and "Chinese" as languages of Asia Pacific are menu-displayed in Asia Pacific menu (third menu layer) 116.

Figure 12B:
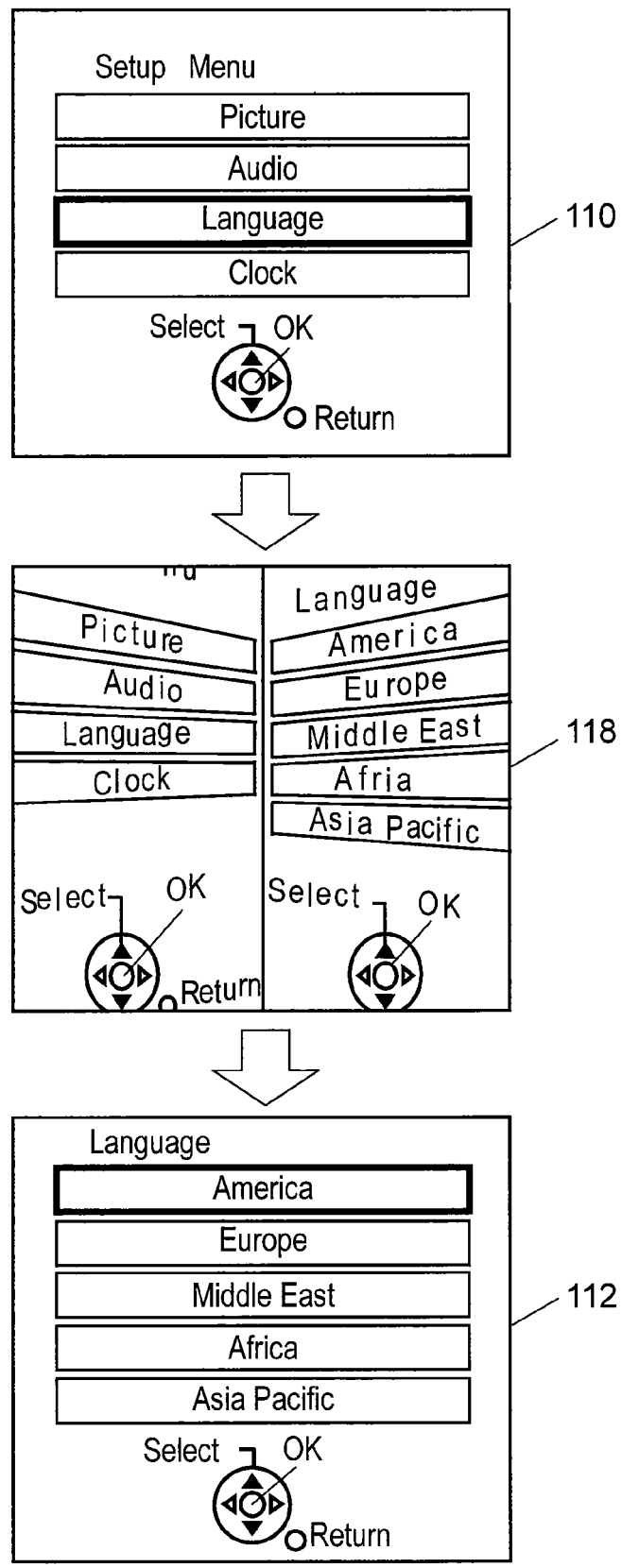
FIG. 12B is a conceptual view of a menu screen display performed by the menu screen display device in Embodiment 2 of the present invention.

Next described is an operation in a virtual space created by menu screen display device 100 in the present embodiment at the time of shifting of the menu layer of the menu screen display. FIGS. 12A and 12B are each a conceptual view of a menu screen display performed by the menu screen display device in Embodiment 2 of the present invention.

Using menu information of setup menu (first menu layer) 110 which is stored in menu information storing part 101 and the position of the menu layer of the first menu layer which is stored in menu layer position storing part 102, menu information describing part 103 creates a menu screen of setup menu (first menu layer) 110 in the virtual space in area A of FIG. 12A. Visual point shifting part 104 then creates a menu screen by image processing as if camera (visual point) 117 is virtually arranged so as to optimally display a whole of setup menu (first menu layer) 110. Accordingly, display part 105 displays setup menu (first menu layer) 110 as shown in an upper part of FIG. 12B.

Upon selection of "Language" in setup menu (first menu layer) 110, menu information describing part 103 creates a menu screen of language menu (second menu layer) 112 in the virtual space in area B of FIG. 12A by using menu information of language menu (second menu layer) 112 which is stored in menu information storing part 101 and the position of the menu layer of the second menu layer which is stored in menu layer position storing part 102. In this case, area B of FIG. 12A is arranged at an angle of, for example, 45 degrees with respect to area A of FIG. 12A. Visual point shifting part 104 then creates a menu screen by image processing as if camera (visual point) 117 is virtually shifted so as to optimally display a whole of language menu (second menu layer) 112. Accordingly, display part 105 displays language menu (second menu layer) 112 as shown in a lower part of FIG. 12B.

Moreover, during the virtual shift of camera (visual point) 117 from setup menu (first menu layer) 110 to language menu (second menu layer) 112, both menus are displayed. In a middle part of FIG. 12B, a state is shown where display part 105 displays in-transition screen 118 as if the menu screen is in three-dimensional transition.

With such a configuration, a menu screen is created based upon menu information and a layer position, to be arranged in a virtual space, and the menu screen is then made to transit from a predetermined visual point, whereby it is possible to switch without describing animation by the number of transition, so as to provide a low-priced menu display device.

Figure 13:
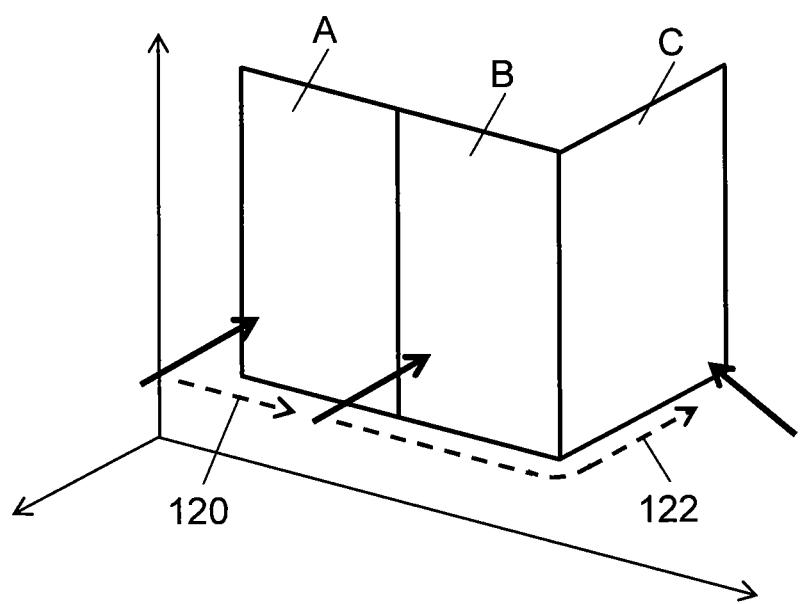
FIG. 13 is another conceptual view of a menu screen display performed by the menu screen display device in Embodiment 2 of the present invention.

It is to be noted that the positional relation between area A as the first menu layer and area B as the second menu layer is made, for example, 45 degrees in the present embodiment as shown in FIG. 12A, it may be 0 degrees, 90 degrees, or some other angle. An example of these cases is shown in FIG. 13. FIG. 13 is another conceptual view of a menu screen display performed by the menu screen display device in Embodiment 2 of the present invention. As shown in FIG. 13, area A as the first menu layer and area B as the second menu layer are on the same plane. Further, area B as the second menu layer and area C as the third menu layer have a positional relation of 270 degrees.

Using such angle relations, in transition of the menu screen from a predetermined visual point as indicated with arrow 120, a layer displayed in area A as the first menu layer and area B as the second menu layer are two-dimensionally continuously displayed. Therefore, this is suitable for a case of a menu display desirably showing a small change associated with a change in layer on display. Further, as indicated with arrow 122, in transition of the menu screen, a layer displayed in area B as the second menu layer and area C as the third menu layer are continuously displayed with a dynamic change in visual point. Therefore, this is suitable for a case of a menu display desirably showing a large change associated with a change in layer on display.

It should be noted that, although only the direction in which the menu layer sequentially becomes deeper from the first menu layer to the third menu layer is described as indicated with arrows 120, 122 in FIG. 13, there can also be a case where transition is made in an opposite direction from arrow 122 to arrow 120 and the menu layer transits in a direction in which the menu layer sequentially becomes narrower from the third menu layer to the first menu layer. These operations are to follow an operation by the user.

As described above, as for the menu screen display device in Embodiment 2 of the present invention, the first menu layer to the third menu layer are described. However, the menu screen display device in the present embodiment is not restricted up to the third menu layer, and may be similarly applicable even when being provided with further more menu layers.

In other words, with "n" taken as an integer not smaller than 1, when determining that an (n+1)th menu layer has been selected in an nth menu layer, menu information describing part 103 describes menu information of the (n+1)th menu layer which is stored in menu information storing part 101 in a position of the (n+1)th menu layer which is stored in menu layer position storing part 102.

Subsequently, when the (n+1)th menu layer is described by menu information describing part 103, visual point shifting part 104 performs image processing so as to shift a visual point on the screen from the nth menu layer to the (n+1)th menu layer. Display part 105 then displays a menu screen obtained by visual point shifting part 104 performing image processing.

Further, when menu information describing part 103 determines that an (n−1)th menu layer has been selected in the nth menu layer and "n" is not smaller than 2, menu information describing part 103 describes menu information of the (n−1)th menu layer which is stored in menu information storing part 101 in a position of the (n−1)th menu layer which is stored in menu layer position storing part 102.

Subsequently, visual point shifting part 104 performs image processing so as to shift a visual point on the screen from the nth menu layer to the (n−1)th menu layer. Display part 105 then displays menu screen obtained by visual point shifting part 104 performing image processing.

Further, when "n" is not smaller than 2, menu information describing part 103 determines whether the (n+1)th menu layer or the (n−1)th menu layer has been selected in the nth menu layer.

With such a configuration, the menu screen display device in the present embodiment is not restricted up to the third menu layer, but may be similarly applicable even when being provided with further more menu layers, thereby being highly versatile.

Figure 14:
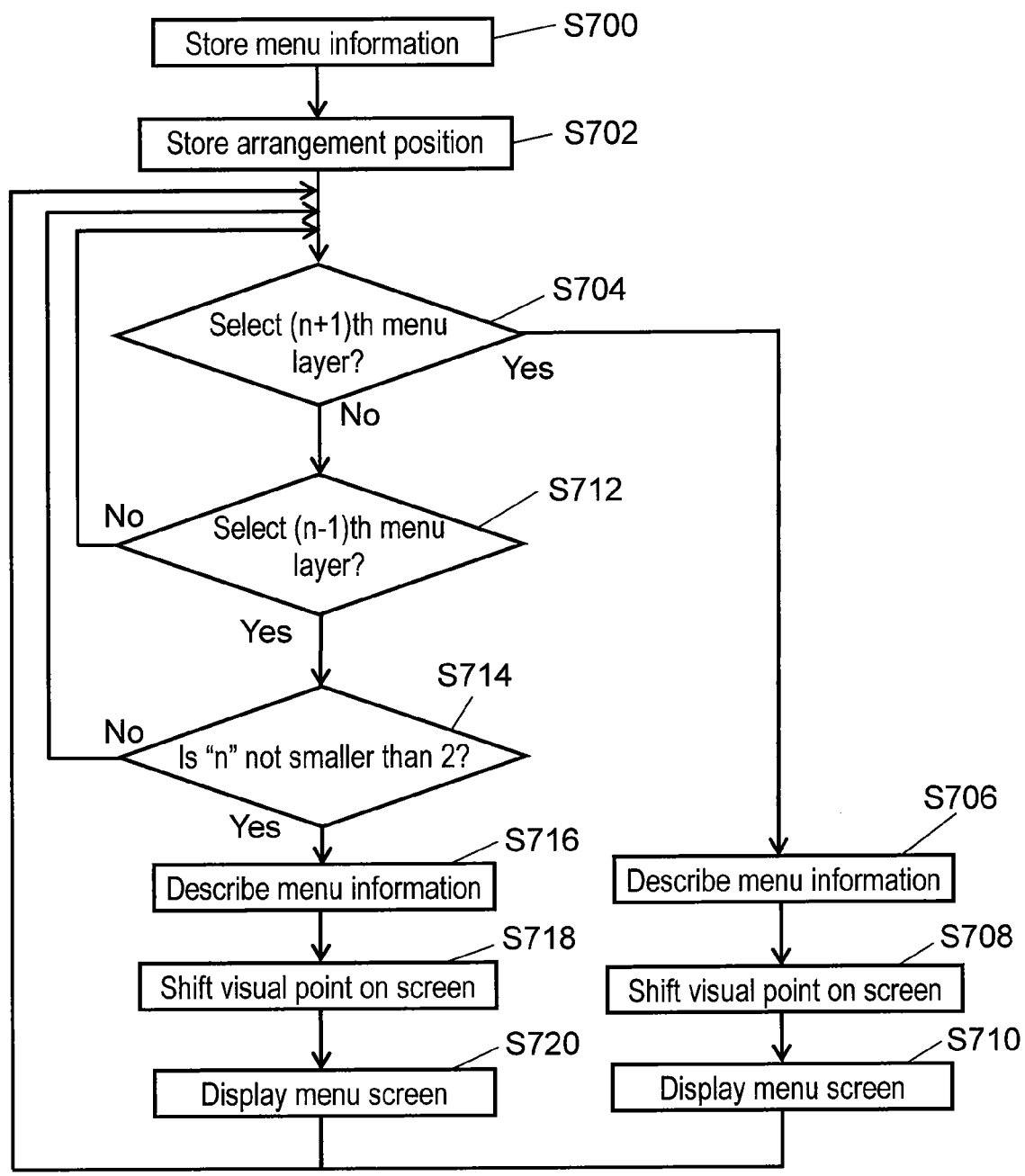
FIG. 14 is a flowchart showing steps of a menu screen displaying method in Embodiment 2 of the present invention.
Figure 15:
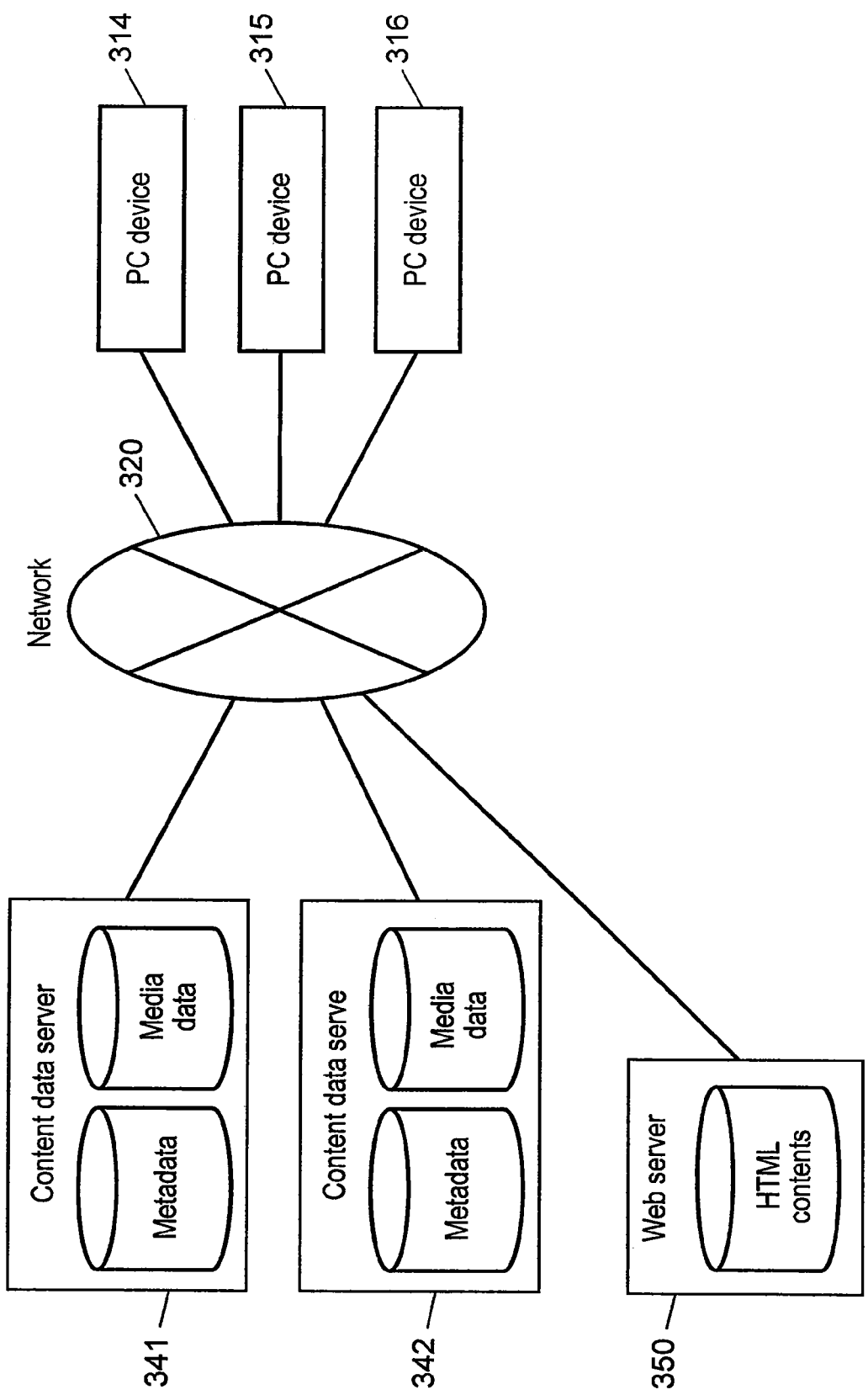
FIG. 15 is a schematic view of a conventional system for performing content browsing.
Figure 16:
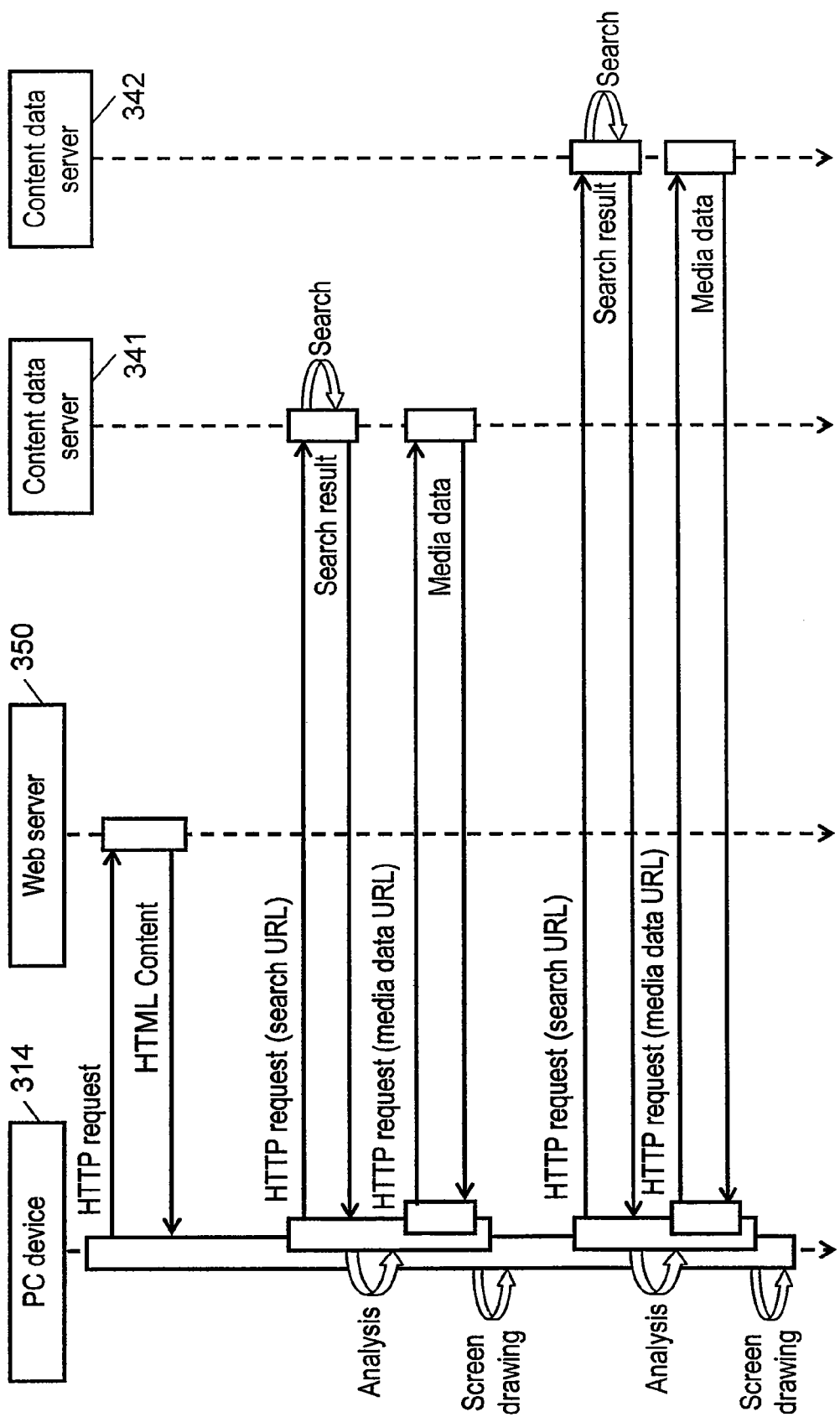
FIG. 16 is a flowchart at the time of conventional content browsing.

Next, the menu screen displaying method in the present embodiment is described. FIG. 14 is a flowchart showing steps of a menu screen displaying method in Embodiment 2 of the present invention. As shown in FIG. 14, the menu screen displaying method in the present embodiment first has a step where menu information is stored by menu information storing part 101 with respect to each menu layer (step S700). Next, a position for arrangement of the menu layer in the virtual space is stored in the menu layer position storing part (step S702).

Subsequently to step S702, menu information describing part 103 determines whether the (n+1)th menu layer has been selected in the nth menu layer ("n" is an integer not smaller than 1) (step S704). In this case, when the (n+1)th menu layer is selected (Yes), menu information of the (n+1)th menu layer is described in the stored position of the (n+1) menu layer of the menu information (step S706). Otherwise (No), the process goes to step S712.

Next, visual point shifting part 104 performs image processing so as to shift the visual point of the screen from the nth menu layer to the (n+1)th menu layer (step S708). Subsequently, display part 105 displays a menu screen (step S710). The process then returns to step S704, to repeat the operation.

Further, in step S704, when the (n+1)th menu layer is not selected (No), menu information describing part 103 determines whether the (n−1)th menu layer has been selected in the nth menu layer ("n" is an integer not smaller than 1) (step S712). In this case, when the (n−1)th menu layer is selected (Yes), whether "n" is not smaller than 2 is determined (step S714). When "n" is not smaller than 2, menu information of the (n−1)th menu layer is described in the stored position of the (n−1)th menu layer of the menu information (step S716). Otherwise (No), the process returns to the selection of the menu layer in the nth menu layer. That is, when "n" is 1 (No) in step S714, the process returns to step S704 where it is determined whether the (n+1)th menu layer has been selected in the nth menu layer.

Subsequently to step S716, visual point shifting part 104 performs image processing so as to shift the visual point on the screen from the nth menu layer to the (n−1)th menu layer (step S718). Display part 105 then displays a menu screen (step S720). Next, the processing returns to step S704, to repeat the operation.

With such a configuration, a menu screen is created based upon menu information and a layer position, to be arranged in a virtual space, and the menu screen is then made to transit from a predetermined visual point, whereby it is possible to switch without describing animation by the number of transition, so as to provide a menu display method at a low price.

As described above, the menu displaying method in the present embodiment is one aspect of the content browsing method for efficiently browsing media data of contents acquired from the network. Accordingly, as described above, the content browsing method may have: a step of storing menu information of the media data with reference to each menu layer; a step of storing a position for arrangement of the menu layer in a virtual space; a step of, when an (n+1)th menu layer ("n" is an integer number not smaller than 1) is determined to have been selected in an nth menu layer, describing menu information of the (n+1)th menu layer in the stored position of the (n+1)th menu layer of the menu information; a step of performing image processing so as to shift a visual point on the screen from the nth menu layer to the (n+1)th menu layer, subsequently to the step of describing the menu information; a step of, in the case of "n" being not smaller than 2 when the (n−1)th menu layer is determined to have been selected in the nth menu layer, describing menu information of the (n+1)th menu layer in the stored position of the (n−1)th menu layer of the menu information; a step of performing image processing so as to shift a visual point on the screen from the nth menu layer to the (n−1)th menu layer, subsequently to the step of describing the menu information; a step of displaying a menu screen obtained by the step of performing image processing; and a step of, in the case of "n" being 1, determining whether the (n+1)th menu layer or the (n−1)th menu layer has been selected in the nth menu layer. With such a method, it is possible to efficiently browse contents on the Internet even with a popular-priced terminal.

INDUSTRIAL APPLICABILITY

According to a content browsing method in accordance with the present invention, it is possible to efficiently browse contents on the Internet not only with a high-priced PC device, but also with a popular-priced CE device such as a television receiver, and the method is useful for one regarding a content browsing method with increased efficiency in browsing of contents disclosed on the Internet, or the like, with a computer and a television receiver.

The invention claimed is:

1. A content browsing system for browsing media data of a content data server which are disclosed on a network, the system comprising:
a consumer electronic device having a processor that transmits content browsing ability data through the network and performs screen drawing of the media data to browse the data; and
a GUI distribution server that receives the content browsing ability data from the consumer electronic device and determines a content browsing ability of the consumer electronic device based upon the received content browsing ability data, the content browsing ability of the consumer electronic device including at least the consumer electronic device having an ability to browse the media data without the GUI distribution server acting as a proxy of the consumer electronic device for server processing and an ability to browse the media data only with the GUI distribution server acting as the proxy of the consumer electronic device;
when the GUI distribution server determines that the consumer electronic device is able to browse the media data only with the GUI distribution server acting as the proxy of the consumer electronic device for server processing, the GUI distribution server synthesizes the media data and transmits the synthesized media data to the consumer electronic device, wherein the synthesized media data is the media data converted to a format allowing the consumer electronic device to browse the media data.

2. A consumer electronic device for performing screen drawing of media data of a content data server which are disclosed on a network, to browse the data, wherein the network includes:
a GUI distribution server having a processor that receives content browsing ability data from the consumer electronic device and determines a content browsing ability of the consumer electronic device based upon the received content browsing ability data, the content browsing ability of the consumer electronic device including at least the consumer electronic device having an ability to browse the media data without the GUI distribution server acting as a proxy of the consumer electronic device for server processing and an ability to browse the media data only with the GUI distribution server acting as the proxy of the consumer electronic device;
when the GUI distribution server determines that the consumer electronic device is able to browse the media data only with the GUI distribution server acting as the proxy of the consumer electronic device for server processing,
the GUI distribution server synthesizes the media data and transmits the synthesized media data to the consumer electronic device, wherein the synthesized media data is the media data converted to a format allowing the consumer electronic device to browse the media data.

3. The consumer electronic device according to claim 2, comprising:
a menu information storing part that stores menu information of the media data with reference to each menu layer;
a menu layer position storing part that stores a position for arrangement of the menu layer in a virtual space;
a menu information describing part that, when an (n+1)th menu layer ("n" is an integer not smaller than 1) is determined to have been selected in an nth menu layer, describes menu information of the (n+1)th menu layer which is stored in the menu information storing part in a position of the (n+1)th menu layer which is stored in the menu layer position storing part;
a visual point shifting part that performs image processing so as to shift a visual point on the screen from the nth menu layer to the (n+1)th menu layer; and
a display part that displays a menu screen obtained by the visual point shifting part performing image processing, wherein,
when an (n−1)th menu layer is determined to have been selected in the nth menu layer,
in a case of "n" being not smaller than 2,
the menu information describing part describes menu information of the (n−1)th menu layer which is stored in the menu information storing part in a position of the (n−1)th menu layer which is stored in the menu layer position storing part, and
the visual point shifting part performs image processing so as to shift a visual point on the screen from the nth menu layer to the (n−1)th menu layer, and
in a case of "n" being 1,
the menu information describing part determines whether the (n+1)th menu layer or the (n−1)th menu layer has been selected in the nth menu layer.

4. The consumer electronic device according to claim 3, wherein
the "n" is 1,
the menu information describing part describes menu information of a second menu layer which is stored in the menu information storing part in a position of the second menu layer which is stored in the menu layer position storing part when the second menu layer is selected in a first menu layer, and
the visual point shifting part performs image processing so as to shift a visual point on the screen from the first menu layer to the second menu layer.

5. A content browsing method for browsing media data of a content data server which are disclosed on a network, the method comprising:
a step where a consumer electronic device transmits content browsing ability data concerning the consumer electronic device to a GUI distribution server;
a step where the GUI distribution server determines a content browsing ability of the consumer electronic device based upon the content browsing ability data, the content browsing ability of the consumer electronic device including at least the consumer electronic device having an ability to browse the media data without the GUI distribution server acting as a proxy of the consumer electronic device for server processing and an ability to browse the media data only with the GUI distribution server acting as the proxy of the consumer electronic device; and
a step where the GUI distribution server determines whether the consumer electronic device is able to browse the media data only with the GUI distribution server acting as the proxy of the consumer electronic device for server processing.

6. The content browsing method according to claim 5, including the following steps when the GUI distribution server determines that the content browsing ability of the consumer electronic device requires proxy for server processing by the GUI distribution server in browsing of contents of the content data server:
a step where the GUI distribution server synthesizes the media data;
a step where the GUI distribution server transmits the synthesized media data to the consumer electronic device, wherein the synthesized media data is the media data converted to a format allowing the consumer electronic device to browse the media data; and
a step where the consumer electronic device performs screen drawing of the media data.

7. The content browsing method according to claim 5, including the following steps when the GUI distribution server determines that the content browsing ability of the consumer electronic device does not require proxy for server processing by the GUI distribution server in browsing of contents of the content data server:
a step where the GUI distribution server transmits non-synthesized media data to the consumer electronic device; and
a step where the consumer electronic device performs screen drawing of the media data.

8. The content browsing method according to claim 5, including the following steps when the GUI distribution server determines that the content browsing ability of the consumer electronic device does not allow browsing of contents of the content data server:
a step where the GUI distribution server transmits, to the consumer electronic device, notification as the data indicating that contents of the content data server cannot be browsed by the consumer electronic device; and
a step where the consumer electronic device performs screen drawing of the notification indicating that the contents cannot be browsed.

9. The content browsing method according to claim 5, including:
a step of storing menu information of the media data with reference to each menu layer;

a step of storing a position for arrangement of the menu layer in a virtual space;

a step of, when an (n+1)th menu layer ("n" is an integer number not smaller than 1) is determined to have been selected in an nth menu layer, describing menu information of the (n+1)th menu layer in the stored position of the (n+1)th menu layer of the menu information;

a step of performing image processing so as to shift a visual point on the screen from the nth menu layer to the (n+1)th menu layer, subsequently to the step of describing the menu information;

a step of, in a case of "n" being not smaller than 2, when the (n−1)th menu layer is determined to have been selected in the nth menu layer, describing menu information of the (n+1)th menu layer in the stored position of the (n−1)th menu layer of the menu information;

a step of performing image processing so as to shift a visual point on the screen from the nth menu layer to the (n−1)th menu layer, subsequently to the step of describing the menu information;

a step of displaying a menu screen obtained by the step of performing image processing; and a step of, in a case of "n" being 1, determining whether the (n+1)th menu layer or the (n−1)th menu layer has been selected in the nth menu layer.

10. The content browsing system according to claim 1, wherein:

the consumer electronic device and the GUI distribution server are separate devices.

11. The content browsing system according to claim 1, wherein:

the GUI distribution server transmits a notification to the consumer electronic device indicating that the consumer electronic device cannot browse the media data when the GUI distribution server determines that the consumer electronic device does not have the content browsing ability to browse the media data.

* * * * *